May 5, 1964 V. L. EGGEBRAATEN ETAL 3,132,248
BETA RADIATION BACKSCATTER GAUGE
Filed Nov. 20, 1961
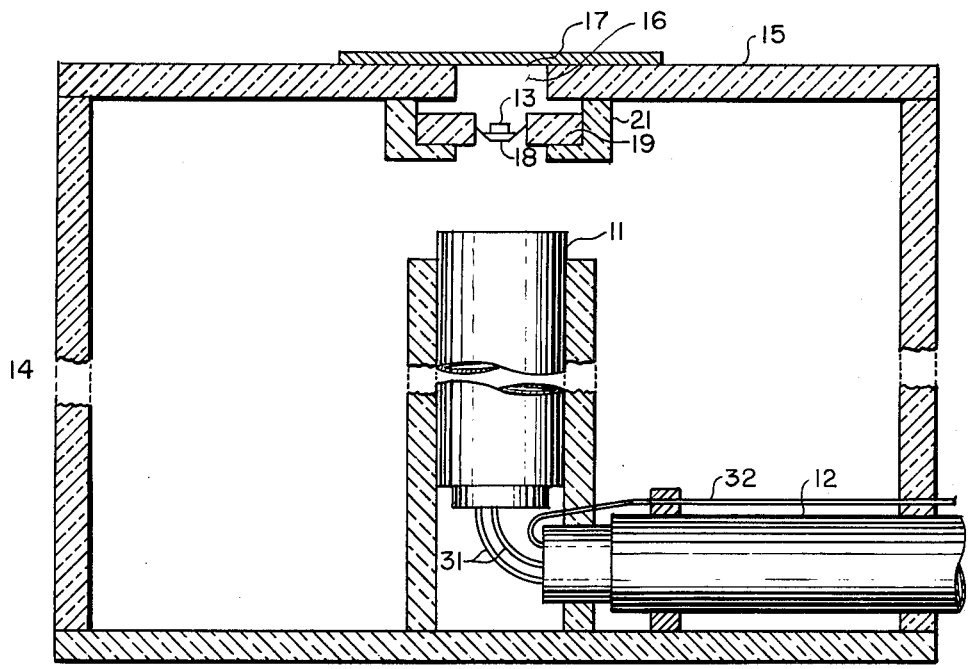
FIG. 1
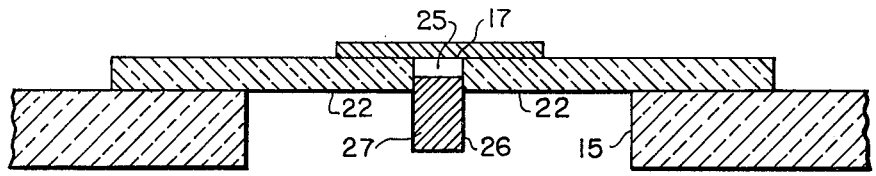
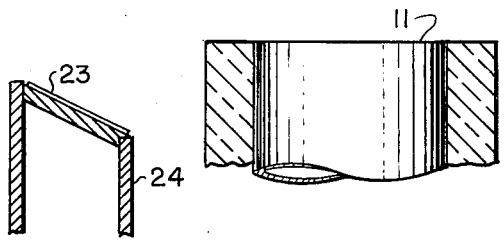
FIG. 2
INVENTORS
KENNETH BENDSCHNEIDER
VERNON L. EGGEBRAATEN
HARRY D. ROMO
ATTORNEY May 5, 1964  V. L. EGGEBRAATEN ETAL  3,132,248
BETA RADIATION BACKSCATTER GAUGE
Filed Nov. 20, 1961  3 Sheets-Sheet 2
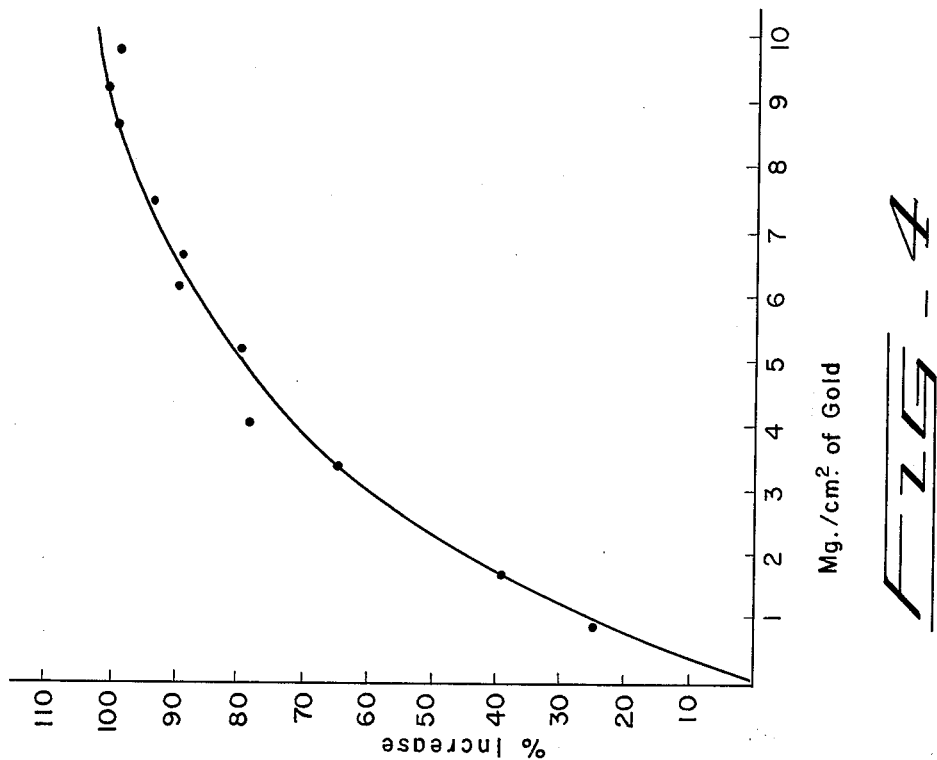
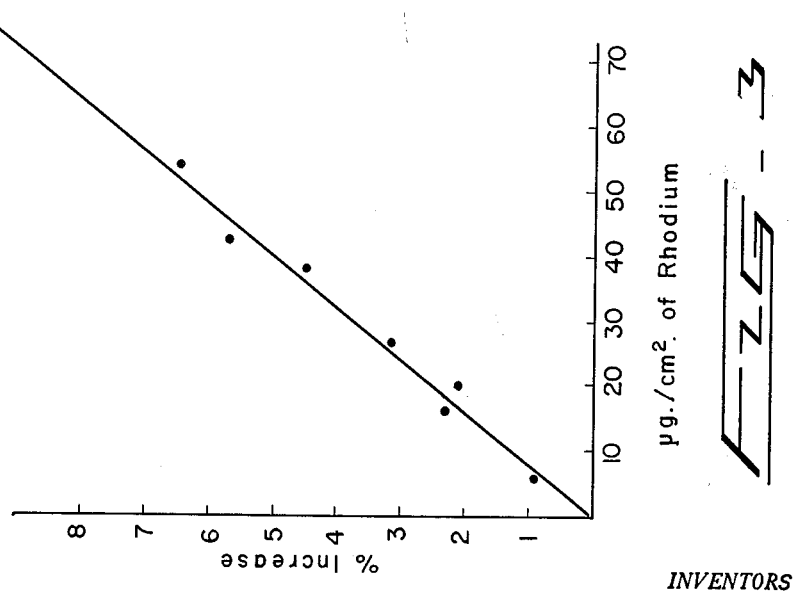
INVENTORS
KENNETH BENDSCHNEIDER
VERNON L. EGGEBRAATEN
HARRY D. ROMO
ATTORNEY May 5, 1964 V. L. EGGEBRAATEN ETAL 3,132,248
BETA RADIATION BACKSCATTER GAUGE
Filed Nov. 20, 1961 3 Sheets-Sheet 3

INVENTORS
KENNETH BENDSCHNEIDER
VERNON L. EGGEBRAATEN
BY HARRY D. ROMO

ATTORNEY

United States Patent Office 3,132,248
Patented May 5, 1964

3,132,248
BETA RADIATION BACKSCATTER GAUGE
Vernon L. Eggebraaten, Harry D. Romo, and Kenneth Bendschneider, Seattle, Wash., assignors to The Boeing Company, Seattle, Wash., a corporation of Delaware
Filed Nov. 20, 1961, Ser. No. 153,318
11 Claims. (Cl. 250—83.3)

This invention relates to apparatus and means for measuring very thin film thicknesses. More particularly these measurements are achieved by means of the beta radiation backscatter technique and apparatus designed to utilize this technique.

In recent years industrial applications for thin metallic coatings have increased extensively. These applications include utilization in printed circuitry, infrared sensing devices, and metal bonding processes. Since many of these thin coatings have a general thickness distribution of from 0.5 to 500 microcentimers the engineering and quality control requirements for thickness measuring techniques are extremely demanding. The microthickness determinations have become increasingly complex since very sensitive, nondestructive, and reliable methods of testing are desired.

One method that has been used to determine the thickness of thin coatings is by weighing a sample before and after coating. Another method involves measurement of the quantity of metallic film per unit area which may be accomplished by X-ray spectroscopy, activation analysis, radioactive tracing, or other sensitive analytical techniques. Problems are encountered when using these procedures unless the sample size is small and the area which is coated is fairly easy to calculate.

Accordingly, it is a primary object of our invention to provide a means and apparatus for measuring thin coatings upon samples of various sizes and irregular surfaces and hence, eliminate these problems.

Another object is to provide an apparatus for measuring thin film thicknesses which will give a rapid, accurate, and nondestructive analysis.

A further object is to utilize a beta-radiation backscatter device for measuring thin films which can use low energy radiation sources.

A still further object is to provide a beta-radiation backscatter device wherein means are provided to change the sources of radiation.

Still further objects and advantages will appear from the following description and drawings.

FIGURE 1 is a cutout, partially in section, side view of the apparatus which has not been drawn to scale.

FIGURE 2 is a cutout side view of a portion of the apparatus modified somewhat from that shown in FIGURE 1, also not drawn to scale.

FIGURE 3 is a graph showing the thickness of rhodium vs. the percent of scattered radiation.

FIGURE 4 is a graph showing the thickness of gold vs. percent radiation scatter.

Figure 5:
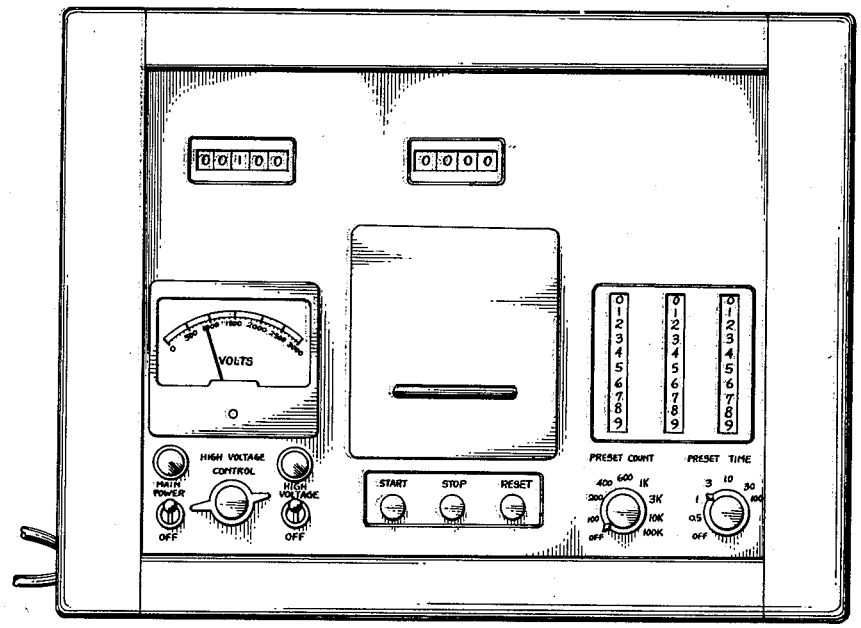
FIGURE 5 is a frontal view of a typical scaler suitable for recording and measuring electrical impulses emitted from the detection apparatus.

We have been able to obtain results superior to methods previously used in measuring very thin films by means of an apparatus utilizing the beta-radiation backscatter technique. The theory of this technique is that beta radiation interacts with matter in such a manner that the scattering of beta particles is dependent upon the atomic number of the scattering material. The statistical probability and thus the intensity of this scatter is closely proportional to atomic number and represents the basis for the measurement of thin films. Since the atomic numbers of the coatings, in our measurements, are different than the base elements, the scatter of beta radiation from these materials will change with the thickness of the coating. A proportional relationship will be observed up to a point approaching the saturation thickness of the coating which is dependent upon the density of the coating and the energy of the radiation. This basic technique is well known and can be found in standard literature upon the subject. However, to develop an apparatus utilizing this technique in order to obtain the accuracy we desired involved a new and different approach to the subject matter. Though superficially our apparatus resembles other beta-radiation backscatter gauges the particular geometrical arrangement of components we use is not found in other beta-radiation backscatter gauges and is necessary to achieve satisfactory results with the extremely thin coatings which we measure with the device.

We have been able to employ the accuracy of beta-radiation backscatter technique in our apparatus with the additional advantage of adaptability to a large assortment of beta-emitting isotopes, representing a wide range of beta energies. By selecting the proper radioactive source for each application the beta backscattering method is an extremely sensitive measuring device for thin films. Our measuring apparatus does not limit the sample to any definite size nor require a calculable area and hence is suitable for many types of measurements beyond the capabilities of previous equipment.

An apparatus we devised for measuring thin coatings is illustrated in FIGURE 1. This backscatter gauge is comprised, in general, of radiation detection means, such as the Geiger tube 11 interconnected to a preamplifier 12 by means of wires 31 which in turn connect to a scaler as shown in FIGURE 5 for detecting reflected beta radiation originally emitted from a source 13. A ground wire 32 is shown attached to a portion of preamplifier 12. These components are contained in a container or housing 14 which, in this embodiment, we made of ¼-inch Plexiglas. In a side 15 located on the top of this container 14 is an opening 16 through which the beta radiation from the source 13 is transmitted and reflected back to the Geiger tube 11 from the sample article 17 upon which the coating thickness is being measured. The side 15 of the container 14 with the opening 16 has means to support the source of radiation 13 so that it is in a position to emit radiation to the article 17 which will backscatter radiation to the Geiger tube 11. In FIGURE 1 the means of support for the source of radiation 13 is a retaining receptacle 18 made of radiation shielding material suspended within a movable retainer 19 which, in turn, is supported by downward projecting portions 21 of the top side 15. The retaining receptacle 18 may be made of any material which effectively acts as a shield between the Geiger tube 11 and the direct radiation from the source 13. As an example of such a material we found glass satisfactory. In order to use our invention for sources of different radiation the movable retainer 19 slides along the supporting portions 21 of the top side 15 in such a manner that the radioactive source 13 in retaining receptacle 18 can be replaced as deemed most satisfactory for the thickness of the coating of the particular sample being measured. The measuring instrumentation suitable for such a device is well known and therefore not illustrated or described.

A modified embodiment of our invention is illustrated in FIGURE 2. Here the sample coating being measured 17 is placed over an opening 25 which is formed by placing radiation shielding material 22 so that only restricted portions of the sample 17 may be measured by reflected radiation. The source of radiation 27 is supported by any suitable means which will position it so that radiation will be emitted to the sample article coating being measured 17 and be backscattered therefrom through the opening 25 to the radiation detector 11. A suitable shielding material 26 is used to cover that portion of the source 27 which would emit direct radiation to the radiation detector 11 if left uncovered. It should be noted that the opening 25 extends beyond the source 27 in directions perpendicular to the section in FIGURE 2 so as to allow backscattering of radiation from the sample coating being measured 17 to the radiation detector 11. An adjustable mirror 23 supported by members 24 helps to accurately align the sample 17 upon which the coating thickness is being measured.

The operation and utility of our invention will be more clearly understood from the following description of particular applications and results obtained with the gauge. The first application that we shall describe will be the procedure for measuring rhodium films.

The backscatter gauge used for these tests was a cubic container 14 made of ¼-inch Plexiglas measuring 1 foot on each side as shown in FIGURE 1. The top side 15 of this gauge holds a changeable radioactive source 13 in the center. A Geiger tube 11 is connected at right angles to a preamplifier 12 which in turn feeds signals to a scaler as shown in FIGURE 5. Once the sample 17 is in position as shown, the scattered radiation intensity to the Geiger tube 11 is easily recorded.

The radioactive source 13 used for this determination consisted of 0.1 mc. of carbon-14 in the form of barium carbonate. The source 13 is located in the bottom of a glass cup 18 with a 3/16-inch inside diameter opening, and is covered with a thin Mylar film. The carbon-14 was purchased from the Oak Ridge National Laboratory and has a specific activity of 0.44 to 2.2 curies per gram of carbon. Carbon-14 was chosen for this application due to its low radiation energy which is a maximum of 0.155 m.e.v. A low energy radiation source is desired because the probability of scatter at the surface of a substance increases as the energy of the radiation decreases and thus results in a much higher degree of sensitivity. Although the efficiency for counting carbon-14 is low due to a large amount of absorption, the efficiency of scatter by a very thin film is extremely high.

Sapphire crystals ¼-inch thick and 1 inch in diameter were used to calibrate this procedure. These crystals were cleaned well and coated with thin vaporized films of metallic rhodium, varying the thickness for each sample. Three separate counting rates were required to measure the amount of radiation scatter from these films. A background count was first taken with the source 21 in position but with no sample over the opening 16. A counting time of 30 minutes was sufficient with the counting rate averaging 600 counts per minute. The back or bare side of the crystal was then placed over the source 13 and the scattered radiation was counted over a period of 90 minutes. This count totaled approximately 140,000. The rhodium-coated side was then counted for the same interval of time. The percent increase in radiation scatter for the rhodium over the base material is computed from Equation 1.

$$\text{Percent increase} = \frac{\text{count of rhodium} - \text{count of base}}{\text{count of base} - \text{background}} \times 100$$

The vapor plated crystal was then weighed on an Ainsworth microbalance with an accuracy of 2.5 micrograms. The sample was scrubbed with a cloth and warm water until the thin coating was removed. After rinsing in alcohol and drying, the sample was weighed again using the difference in weight per unit area as the standardized thickness. The first few samples were scrubbed again and reweighed to check for a loss of weight due to the scrubbing action. However, no difference in weight was noticeable.

FIGURE 3 represents a graph of these calibrated samples showing the increase in radiation scatter vs. the film thickness.

The determination of an unknown film thickness requires three counting periods as in the calibration procedure. However, one 30-minute background count and one 90-minute count of the base is sufficient for an entire group of samples provided they are of the same base material. Each individual crystal must be counted for 90 minutes with the rhodium coated side facing the source. These data are formulated in Equation 1 giving the percent increase in counting rate. The resulting value is plotted on a calibrated group (FIGURE 3) to obtain the rhodium thickness.

The limiting factor for accuracy in this determination is the statistical error found in the total count. Assuming the scattered radiation from a crystal yields a total count of approximately 140,000, the statistical error at a 95% confidence level will be 720 counts. This is equivalent to an error of 6 micrograms per square centimeter or approximately 0.5 microcentimeter.

A larger total count will reduce the statistical error appreciably and will be useful up to a point approaching the accuracy of the microbalance used for calibration which is 2.5 micrograms, being equivalent to 1.25 microgram per square centimeter of rhodium. A larger counting rate will be obtained by using a source of higher specific activity so as to partially eliminate self-absorption effects. This will also allow the strength of the source to be increased.

Another application tested was the procedure for measuring the thickness of gold on printed circuits. The primary obstacle to overcome when measuring the thickness of an article coating which is a 40-mil wide circuit is to scatter the radiation only from the circuit itself. This is essential since the width of the circuit is not precisely constant. These fluctuations of circuit width will result in erratic readings of radiation scatter if the scatter is from both the circuit and surrounding base material. In addition, the geometrical position of the source, sample, and probe must be arranged to efficiently detect the scatter from the circuit without experiencing an abnormally high backround count.

The only alterations made on the previously described backscatter gauge are in the position of the source and the opening in the top side of the gauge through which the radiation is allowed to traverse to the sample and back to the detector. The ¾-inch diameter opening 16 shown in FIGURE 1 is now changed to a very narrow opening 25 measuring 30 mils in width by ¾-inch in length as illustrated in FIGURE 2. This is done by placing two sheets of Plexiglas 22 (6 x 6 x ⅛ inches) over the center of the opening 25 and securing them 30 mils apart from each other. The 40-mil wide circuit sample 17 is placed over this opening 25 and aligned to cover it completely by the use of mirrors such as 23 located at appropriate angles and supported by the gauge housing. Radiation will now scatter from the circuit sample 17 alone and will be recorded on the Geiger tube 11 mounted below.

Pm$^{147}$ was found to be the most appropriate source of radioactive material for measuring gold thickness in the range of 100- to 500-microcentimeters. Pm$^{147}$ has a beta energy of 0.23 m.e.v. and a half life of 2.6 years. Five hundred microcuries of the carrier-free isotope in the form of PmCl$_3$ dissolved in 1 ml. of HCl were used to prepare a solution for plating. This solution was diluted to 3 ml. to which 3 mg. of TlNO$_3$ carrier were for better electrolytical deposition. A copper wire 27 ¼-inch in length and 1/16-inch in diameter was used as a mandrel upon which the Pm$^{147}$ was plated. The top 1/16-inch of the wire 27 was first pressed to a width of 30 mils. The Pm$^{147}$ was then plated on this surface of wire 27 at 3 volts for 30 minutes so as to make the plated wire 27 the source of radiation. A very thin lead foil 26 was wrapped completely around the cylindrical part of the plated wire 27 except where the wire was to make contact and be supported by the Plexiglas plates 22. This was essential for lowering the background count. The top 1/16-inch of the plated wire 27 which was made 30 mils in width, was wedged between the two Plexiglas plates 22 as they were glued to the top side 15 of the gauge, thus forming the 30-mil wide opening 25.

Copper coupons 1 inch in diameter were used to calibrate this procedure. These disks were weighed on an Ainsworth microbalance before and after gold plating to an accuracy of 2.5 micrograms.

Three minute counting intervals were used with the count averaging 11,000 c.p.m. for background and 17,000 to 25,000 c.p.m. with samples in position over the slit. These results are plotted in FIGURE 4 with the percent increase in radiation scatter calculated from Equation 1 in which copper is the base material.

The accuracy of each determination is again dependent on the statical error found in the total count. For these particular tests, the count over a 3-minute interval is approximately 60,000. For this value, the statistical variation at a 95% confidence level is 480 counts. This is equivalent to 18 microcentimeters over most of the given thickness range.

In a like manner a wide range of other coating material thicknesses may be ascertained. The accuracy and the adaptability of our gauge to wide ranges of thicknesses make it quite valuable as an analytical tool. It should be noted that the sources emitting weak beta radiation, that is, generally less than 0.25 m.e.v., are used for very thin films such as the ones discussed here and in some cases have a sensitivity approaching 0.25 microcentimeter. The measurement of thicker films extending to several mils is determined using sources with beta energies ranging from 0.5 to 1.5 m.e.v. We have found, for instance, that 0.76 m.e.v. radiation from thalium-204 is suitable to use for measurement of copper thickness on a phenolic base wherein the thickness range is 1000 to 6000 microcentimeters.

Though we have described in detail several particular applications of our invention these examples are meant to be illustrative only and not a limitation upon the scope of our invention.. These examples are intended to show the high degree of accuracy and wide range of thicknesses to which our invention may be adapted which has not been possible to achieve with the prior thickness measuring gauges. These vastly superior results are due to the particular arrangement of components previously described and henceforth delineated by the following claims.

We claim:

1. A thickness measuring device comprising a container for supporting the operative components of the device, said container being provided with an opening through one of its sides; means for supporting an article with a coating thickness to be measured exterior of said container, the coated portion of said article being positioned facing toward the interior of said container and abutting the container over the opening in the side; detection means supported within said container which emits signals proportional to beta radiation detected; signal measuring means responsive to said detection means; a source of radioactive beta energy supported by said container and positioned between the detection means and the article coating being measured; and radiation shielding means between the source of radioactive beta energy and the beta radiation detector, said shielding means being positioned so as to prevent direct beta radiation from striking the beta radiation detecting means but not block the backscattered beta radiation from the coated article.

2. A thickness measuring device comprising a container for supporting the operative components of the device, said container being provided with an opening through one of its sides; means for supporting an article with a coating thickness to be measured exterior of said container, the coated portion of said article being positioned facing toward the interior of said container and abutting the container over the opening in the side; detection means supported within said container which emits signals proportional to beta radiation detected; signal measuring means responsive to said detection means; a mandrel coated with radioactive beta energy material positioned between the detection means and the article coating being measured, said mandrel coated with radioactive beta energy material being supported between the sides of the opening in said container, but not filling all of said opening; and radiation shielding material covering that portion of the mandrel coated with radioactive beta energy material which would emit direct beta radiation to the beta radiation detector unless shielded therefrom.

3. A thickness measuring device as defined by claim 2 with mirror means supported by the container for aligning the article with the coating thickness being measured, the mandrel coated with radioactive beta energy material, and the detection means.

4. A device for measuring the thickness of thin coatings on articles comprising a container for supporting the operative components of the device, said container being provided with an opening through one of its sides; means for supporting an article with a coating thickness to be measured exterior of and abutting said container and covering said opening therein, the coated portion of said article being positioned facing toward the interior of said container; beta radiation detection means within said container which emits signals proportionate to beta radiation detected, said beta radiation detection means being supported inside the container by the side opposite from the side containing said opening and being in alignment with said opening and the article coating being measured; signal measuring means responsive to said beta radiation detection means; a retaining means supported by the container adapted for holding various radioactive beta energy sources between the article coating thickness being measured and the detection means, said retaining means having radiation shielding properties and being in alignment with the article coating being measured, the opening in the side of the container, and the beta radiation detection means; and a source of radioactive beta energy supported by said retaining means positioned so as to be shielded from emitting direct beta radiation to the beta radiation detection means.

5. A device for measuring the thickness of thin coatings on articles as defined in claim 4 wherein the beta radiation detection means in a Geiger tube.

6. A device for measuring the thickness of thin coatings as defined in claim 4 wherein the retaining means is positioned so that its radiation shielding properties prevents direct beta radiation from the radioactive beta energy source from reaching the beta radiation detection means but not backscattered beta radiation from the article coating being measured from reaching the beta radiation detection means.

7. A device for measuring the thickness of thin coatings on articles comprising a container for supporting the operative components of the device, said container being provided with an opening through one of its sides; means for supporting an article with a coating thickness to be measured in abutting relationship with said container and substantially covering said opening therein, the coated portion of said article being positioned toward the interior of said container; detection means emitting signals proportionate to beta radiation detected supported on the side opposite from the side containing said opening and in direct alignment with said opening; signal measuring means responsive to said detection means; a means supported by the container adapted for holding a radioactive beta energy source between the article coating being measured and the detection means, said means being made of radiation shielding material and being in alignment between the article coating being measured, the opening in the side of the container and the detection means; and a source of radioactive beta energy supported by said holding means positioned so as to be shielded from emitting direct radiation to the detection means.

8. A thickness measuring gauge comprising a housing having an opening restricted so as to allow to pass through said opening only backscattered radiation from the coating thickness being measured, means for supporting the coating thickness to be measured exterior of said restricted opening and in abutting relationship with said housing, a beta radiation detector interiorly supported by said housing, said beta radiation detector being responsively interconnected to recording means, a source of radioactive beta energy retained within said housing and positioned interiorly of said restricted opening in alignment between the coating thickness being measured and the beta radiation detector so as to backscatter beta radiation only from the coating thickness being measured to the beta radiation detector, and radiation shielding material covering that portion of the source of beta radiation which would emit direct beta radiation to the beta radiation detector if not shielded therefrom.

9. A device for measuring the thickness of a coating, said device including a supporting means having an opening, a coated specimen disposed in abutting relationship with said supporting means and covering at least a portion of the opening, a radioactive beta energy source positioned in a retaining receptacle for directing beta radiation onto the coated specimen through the opening in said supporting means thereby to produce beta radiation backscatter from that region of the coated specimen covering at least a portion of the opening in said supporting means, a beta radiation detector disposed to receive beta radiation backscatter and indicate the amount of such received beta radiation backscatter, said coated specimen, said retaining receptacle and said beta radiation detector being supported in alignment, and shielding means covering that portion of the retaining receptacle which would permit direct beta radiation to reach the measuring means.

10. A device for measuring the thickness of a coating as described in claim 9 wherein mirror means are utilized to align the coated specimen, retaining receptacle and beta radiation detector.

11. A measuring device including a supporting means having an opening, a test specimen disposed in abutting relationship with said supporting means and covering a portion of the opening, a source of weak beta radiation positioned in a retaining receptacle for directing radiation onto the test specimen through the opening in said supporting means thereby to produce radiation backscatter from that region of the test specimen covering a portion of the opening in said supporting means, measuring means disposed to receive beta radiation backscatter and indicate the amount of such received beta radiation backscatter, and shielding means covering that portion of the retaining receptacle which would permit direct beta radiation to reach the measuring means.

References Cited in the file of this patent

UNITED STATES PATENTS

| | | |
|---|---|---|
| 2,593,206 | Short | Apr. 15, 1952 |
| 2,964,633 | Bernstein | Dec. 13, 1960 |
| 3,048,701 | Thomas | Aug. 7, 1962 |
| 3,056,027 | Martinelli | Sept. 25, 1962 |

FOREIGN PATENTS

| | | |
|---|---|---|
| 603,016 | Canada | Aug. 9, 1960 |